(12) United States Patent
Serebrin

(10) Patent No.: US 9,747,122 B2
(45) Date of Patent: Aug. 29, 2017

(54) VIRTUAL MACHINE SYSTEMS

(71) Applicant: Google Inc., Mountain View, CA (US)

(72) Inventor: Benjamin C. Serebrin, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 73 days.

(21) Appl. No.: 14/688,258

(22) Filed: Apr. 16, 2015

(65) Prior Publication Data

US 2016/0306645 A1    Oct. 20, 2016

(51) Int. Cl.
*G06F 9/46*      (2006.01)
*G06F 9/455*      (2006.01)
*G06F 9/54*      (2006.01)

(52) U.S. Cl.
CPC .......... *G06F 9/45558* (2013.01); *G06F 9/546* (2013.01); *G06F 2009/4557* (2013.01)

(58) Field of Classification Search
CPC .............................. G06F 9/4881; G06F 9/4557
See application file for complete search history.

(56) References Cited

U.S. PATENT DOCUMENTS

| | | | | |
|---|---|---|---|---|
| 2002/0165899 A1* | 11/2002 | Kagan et al. | ....... | G06F 12/1466 718/104 |
| 2005/0144422 A1* | 6/2005 | McAlpine et al. | ..... | G06F 12/08 700/206 |
| 2011/0161955 A1 | 6/2011 | Woller et al. | | |
| 2012/0229481 A1* | 9/2012 | McCrary | ............... | G06F 9/5044 345/522 |
| 2013/0007751 A1* | 1/2013 | Farrell et al. | ............. | G06F 9/46 718/102 |
| 2013/0174144 A1 | 7/2013 | Cheng | | |
| 2013/0198312 A1 | 8/2013 | Tamir et al. | | |
| 2014/0181323 A1 | 6/2014 | Manula | | |

OTHER PUBLICATIONS

"Allocate Memory Resources in the vSphere Web Client", downloaded from the internet on Feb. 11, 2015, http://pubs.vmware.com/vsphere-51/index.jsp?topic=%2Fcom.vmware.vsphere.vm_admin.doc%FGUID-49D7217C-DB6C-41A6-86B3-7AFEB8BF575F.html, 2 pages.

(Continued)

*Primary Examiner* — Camquy Truong
(74) *Attorney, Agent, or Firm* — Fish & Richardson P.C.

(57) ABSTRACT

Methods, systems, and apparatus, including computer programs encoded on computer storage media, for memory requests by a virtual machine. One of the methods includes generating a plurality of doorbell pages for a plurality of virtual machines executing on a device, providing, to each of the plurality of virtual machines, access to a respective one of the plurality of doorbell pages that identifies a queue that stores requests from the respective virtual machine, receiving, from a particular one of the plurality of doorbell pages, a notification that the respective queue has a request from the respective virtual machine, and in response to receiving the notification that the respective queue has a request from the respective virtual machine, causing a processor to process the respective queue for the respective virtual machine.

19 Claims, 6 Drawing Sheets

(56) References Cited

OTHER PUBLICATIONS

"Virtual Machine Resource Allocation Tab", downloaded from the internet on Feb. 11, 2015, https://pubs.vmware.com/vsphere-4-esx-vcenter/index.jsp?topic=/com.vmware.vsphere.resourcemanagement.doc_41/getting_started_with_resource_management/c_virtual_machine_resource_allocation_tab.html, 3 pages.
Clark, Christopher et al. "Live Migration of Virtual Machines", 14 pages.
Huang, Wei, "Introduction of AMD Advanced Virtual Interrupt Controller", XenSummit Aug. 2012, downloaded from the internet on Feb. 11, 2015, http://www.slideshare.net/xen_com_mgr/introduction-of-amd-virtual-interrupt-controller, 6 pages.
Hyper-V Dynamic Memory Configuration Guide, published Jul. 12, 2010, updated Feb. 16, 2011, downloaded from the internet on Feb. 11, 2015, https://technet.microsoft.com/en-us/library/ff817651(v=ws.10).aspx, 17 pages.
Kleidermacher, David, "Hypervisors and the Power Architecture", Tech Design Forum Techniques, posted Sep. 10, 2010, downloaded from the internet on Feb. 11, 2015, http://www.techdesignforums.com/practice/technique/hypervisors-and-the-power-architecture/, 11 pages.
Kleidermacher, David, "Hypervisors Thrive with Power Architecture", Power.com White Paper, Oct. 11, 2009, 13 pages.
Macdonnell, A. Cameron, "Shared-Memory Optimization for Virtual Machines", Thesis Submitted to the Faculty of Graduate Studies and Research in Partial Fulfillment of the Requirements for the Degree of Doctor of Philosophy, University of Alberta, Department of Computing Science, Fall 2011, 138 pages.
Pfaff, Ben, "Improving Virtual Hardware Interfaces", a dissertation submitted to the Department of Computer Science and the Committee on Graduate Studies of Stanford University in Partial Fulfillment of the Requirements for the Degree of Doctor of Philosophy, Oct. 2007, 117 pages.
Willmann, Paul et al., "Concurrent Direct Network Access for Virtual Machine Monitors", IEEE 12th International Symposium on High Performance Computer Architecture (HPCA) 2007, 12 pages.
"Circular buffer," from Wikipedia, the free encyclopedia, Jan. 6, 2015 [retrieved on Feb. 10, 2016]. Retrieved from the Internet: URL<https://web.archive.org/web/20150106091311/http://en.wikipedia.org/wiki/Circular_buffer>, 13 pages.
International Search Report and Written Opinion in International Application No. PCT/US2016/025303, dated Oct. 5, 2016, 19 pages.
Invitation to Pay Additional Fees in International Application No. PCT/US2016/025303, dated Jun. 3, 2016, 8 pages.

* cited by examiner

VIRTUAL MACHINE SYSTEMS

BACKGROUND

This specification relates to memory access by virtual machine systems.

Virtual machines, e.g., cloud virtual machines, sometimes require a constrained bidirectional communication path to their virtual devices. For instance, a virtual machine may use a circular buffer with head and tail pointers. A hypervisor, hypervisor's agent, or trusted physical device may poll the head pointer to determine when a virtual machine has enqueued new requests, and may read the contents of the queue. Some systems may use several processor cores to poll queues.

SUMMARY

In some implementations, a hypervisor, e.g., a hypervisor helper, may monitor multiple queues for multiple virtual machines, and potentially multiple queues for each virtual machine, using a doorbell page for each queue. The hypervisor uses the doorbell pages to determine whether and when there are entries in the queues that include work for a processor. The hypervisor may update a bit vector when a doorbell page is rung, and provide the bit vector to the processor, to indicate which queues need service. When a doorbell page is rung, the hypervisor may copy a doorbell page or a value from the doorbell page to memory, e.g., for use by the hypervisor or a processor. The hypervisor may send an interrupt to a processor to notify the processor of the work when the processor may be performing other work. The hypervisor helper may be an application or hardware configured to perform the steps described above.

In some implementations, a helper application or device, e.g., a hypervisor or a hypervisor helper application or device, may control memory access during migration of an application, e.g., a virtual machine, from a first device to a second device. The helper may monitor pages of memory used by the application and cause only dirty bytes from the pages to be transferred to the second device during the migration process.

In general, one innovative aspect of the subject matter described in this specification can be embodied in methods that include the actions of generating a plurality of doorbell pages for a plurality of virtual machines executing on a device, providing, to each of the plurality of virtual machines, access to a respective one of the plurality of doorbell pages that identifies a queue that stores requests from the respective virtual machine, receiving, from a particular one of the plurality of doorbell pages, a notification that the respective queue has a request from the respective virtual machine, and in response to receiving the notification that the respective queue has a request from the respective virtual machine, causing a processor to process the respective queue for the respective virtual machine. Other embodiments of this aspect include corresponding computer systems, apparatus, and computer programs recorded on one or more computer storage devices, each configured to perform the actions of the methods.

In general, one innovative aspect of the subject matter described in this specification can be embodied in methods that include the actions of initiating a migration process to move an application executing on a first device from the first device to a second device by copying pages of data, stored in a memory of the first device and used for the execution of the application on the first device, from the first device to the second device while continuing to execute the application on the first device, updating, by the first device, one or more bytes in at least one of the pages of data in response to executing the application on the first device during the migration process, stopping execution of the application on the first device, and copying the updated bytes from the first device to the second device to cause the second device to continue execution of the application. Other embodiments of this aspect include corresponding computer systems, apparatus, and computer programs recorded on one or more computer storage devices, each configured to perform the actions of the methods.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include continuing to execute the respective virtual machine while the processor processes the request. The method may include receiving an update to the respective queue prior to receiving the notification that the respective queue has a request from the respective virtual machine.

In some implementations, the method includes generating an array that includes, for each of the plurality of doorbell pages, a respective entry that uniquely corresponds to the doorbell page and uniquely identifies the queue identified by the doorbell page, and in response to receiving the notification that the respective queue has a request from the respective virtual machine, updating the respective entry in the array that identifies the respective queue. Causing the processor to process the respective queue for the respective virtual machine may include providing the array to the processor to cause the processor to process the respective queue for the respective virtual machine. Generating the array that includes, for each of the plurality of doorbell pages, a respective entry that uniquely corresponds to the doorbell page and uniquely identifies the queue identified by the doorbell page may include generating a bit vector that includes, for each of the plurality of doorbell pages, a respective entry that uniquely corresponds to the doorbell page and uniquely identifies the queue identified by the doorbell page. Updating the respective entry in the array that identifies the respective queue may include updating the respective entry in the bit vector that identifies the respective queue. Providing the array to the processor to cause the processor to process the respective queue for the respective virtual machine may include providing the bit vector to the processor to cause the processor to process the respective queue for the respective virtual machine. Providing the array to the processor to cause the processor to process the respective queue for the respective virtual machine may include providing the array to the processor to cause the processor to process multiple queues for the plurality of virtual machines.

In some implementations, causing a processor to process the respective queue for the respective virtual machine includes sending an interrupt to the processor. Providing, to each of the plurality of virtual machines, access to the respective one of the plurality of doorbell pages that identifies the queue that stores requests from the respective virtual machine may include providing, to each of the plurality of virtual machines, access to a respective one of the plurality of doorbell pages that includes a head node of the respective queue. Providing, to each of the plurality of virtual machines, access to the respective one of the plurality of doorbell pages that identifies the queue that stores requests from the respective virtual machine may include providing, to each of the plurality of virtual machines, access to a respective one of the plurality of doorbell pages that identifies a ring buffer that stores requests from the respective virtual machine.

In some implementations, generating the plurality of doorbell pages includes assigning a respective address to each of the plurality of doorbell pages, and providing, to each of the plurality of virtual machines, access to the respective one of the plurality of doorbell pages that identifies the queue that stores requests from the respective virtual machine includes providing, to each of the plurality of virtual machines, the respective address to the respective virtual machine. Generating the plurality of doorbell pages may include generating a tracking structure and assigning a respective index from the tracking structure to each of the plurality of doorbell pages, and providing, to each of the plurality of virtual machines, access to the respective one of the plurality of doorbell pages that identifies the queue that stores requests from the respective virtual machine may include providing, to each of the plurality of virtual machines, an address for the respective index to the respective virtual machine. Generating the plurality of doorbell pages may include generating a page for each of the plurality of doorbell pages, and assigning, for each of the plurality of doorbell pages, a non-zero offset at which the respective one of the plurality of doorbell pages resides within the respective page. Providing, to each of the plurality of virtual machines, access to the respective one of the plurality of doorbell pages that identifies the queue that stores requests from the respective virtual machine may include providing, to each of the plurality of virtual machines, an address for the respective page and the non-zero offset to the respective virtual machine.

In some implementations, the method includes generating a second plurality of doorbell pages, and providing, to each of at least some of the plurality of virtual machines, access to a respective one of the second plurality of doorbell pages that identifies a second queue that stores second requests from the respective virtual machine, a first type of the requests being different than a second type of the second requests. Receiving, from the particular one of the plurality of doorbell pages, the notification that the respective queue has a request from the respective virtual machine may include receiving, from the particular one of the plurality of doorbell pages, a notification that identifies a type of request. Causing the processor to process the respective queue for the respective virtual machine may include determining that the type of request includes the first type, determining a particular processor assigned to service requests of the first type, and causing the particular processor to process the respective queue for the respective virtual machine. The method may include executing the plurality of virtual machines on a first processor of the device. Causing the particular processor to process the respective queue for the respective virtual machine may include providing a message to a hypervisor executing on a second, different processor to cause the second, different processor to process the respective queue for the respective virtual machine. Providing the message to the hypervisor executing on the second, different processor may include providing the message to the hypervisor executing on the second, different processor on a second device different from the device.

In some implementations, the method may include creating a mapping for the application identifying locations in the memory of the pages of data. Updating, by the first device, the one or more bytes in at least one of the pages of data in response to executing the application on the first device during the migration process may include assigning each of the at least one of the pages of data to a helper, updating, for each of the at least one of the pages, the mapping for the application to identify a corresponding page in the helper, and updating the one or more bytes in the at least one of the pages of data. Executing the application on the first device may include executing a virtual machine on the first device.

In some implementations, the method includes storing, by the first device, data identifying the updated bytes in response to updating the one or more bytes in at least one of the pages of data. Copying only the updated bytes from the first device to the second device may include identifying the updated bytes using the data identifying the updated bytes, and copying only the updated bytes from the first device to the second device in response to identifying the updated bytes using the data identifying the updated bytes. The method may include receiving, by the first device, the one or more bytes in the at least one of the pages of data, and determining, by the first device, that the one or more bytes are for the pages of data for the application which is being migrated. Storing the data identifying the updated bytes may include storing the data identifying the updated bytes in response to determining that the one or more bytes are for the pages of data for the application which is being migrated. The method may include receiving a request for access to memory from the application, and determining that the request for access to memory is a write request. Storing the data identifying the updated bytes may include storing the data identifying the updated bytes in response to determining that the request for access to memory is a write request. The method may include executing the application on the first device including storing pages of data for the application in the memory of the first device.

The subject matter described in this specification can be implemented in particular embodiments and may result in one or more of the following advantages. In some implementations, the systems and methods described below may determine when a virtual machine places a data request in a queue more quickly, e.g., within one microsecond, use fewer resources, or both, than systems and methods that do not use doorbell pages with acceleration due to a hypervisor or a helper application or device. In some implementations, the systems and methods described below may continue to execute a virtual machine when a doorbell page is rung and requests in a corresponding queue are processed, e.g., asynchronously.

In some implementations, the systems and methods described below may provide a bit vector to a processor to allow a hypervisor, a processor, or both, quickly determine which virtual machines need service. For instance, a system may know more quickly when a doorbell page was rung by a virtual machine, unlike a doorbell polling agent, allowing the system to respond when the system includes thousands of instantiated doorbell pages. In some implementations, when the doorbell pages reside in peripheral component Interconnect Express (PCIe) space, the device avoids the traditional trap-and-emulate traps, e.g., which may consume at least 3000 processor cycles or one microsecond, that may be required by a virtual machine access to purely software-emulated device doorbells. In some implementations, a system may provide a notification for a virtual machine executing on a first processor with a queue that needs service to a second processor to prevent the servicing of the queue from stealing cycles from the virtual machine during execution on the first processor, to prevent pollution of the first processor's cache, to allow the second processor to process queues, e.g., for the same or similar types of requests, from multiple virtual machines, or any combination of two or more of these.

In some implementations, the systems and methods described below may copy only dirty bytes or byte blocks, e.g., smaller than a page, when transferring an application between devices to reduce blackout time for the application, e.g., in a cloud environment, compared to other systems and methods that transfer pages of memory.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
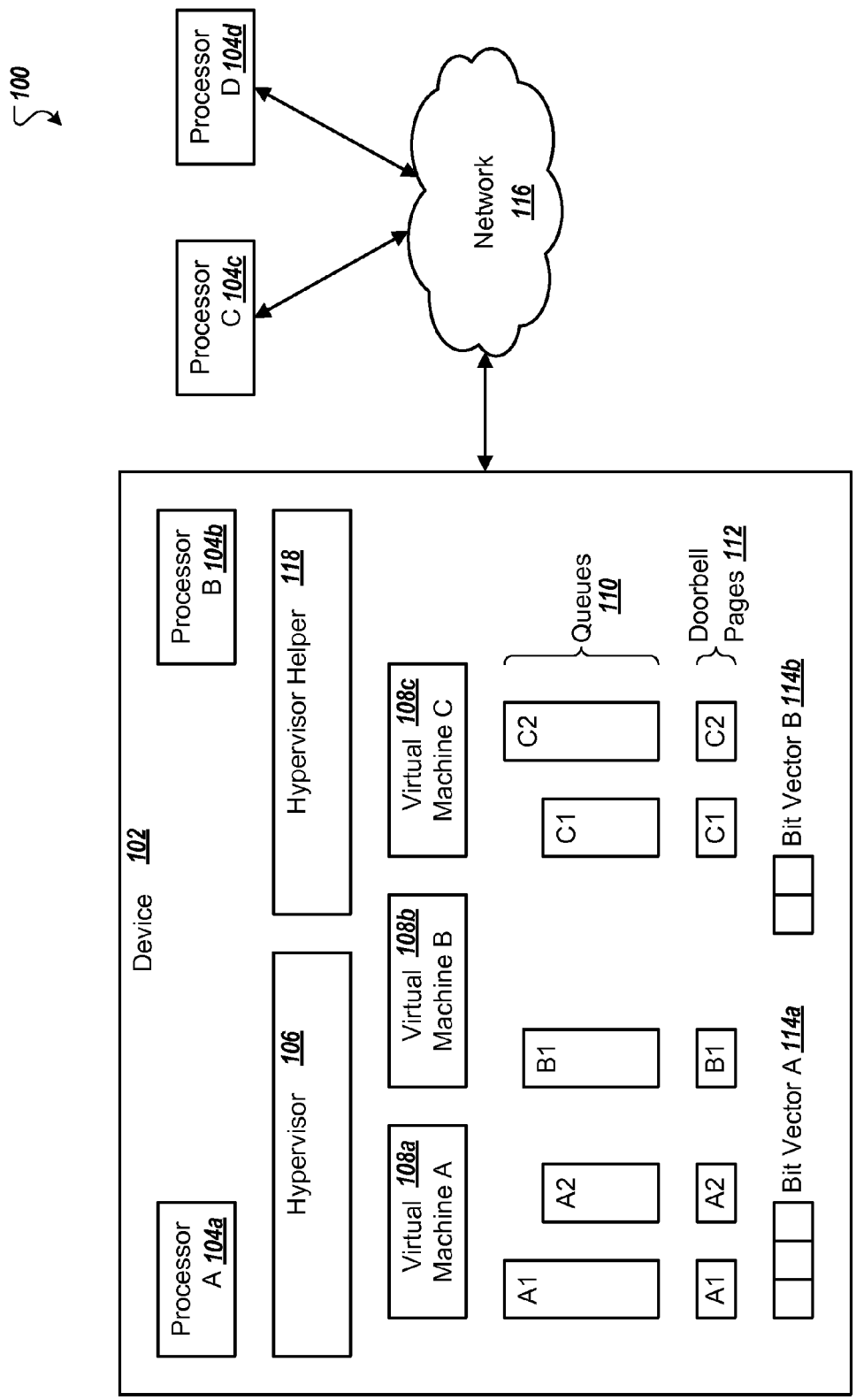
FIG. 1 is a block diagram of an example environment in which a device uses doorbell pages to determine when queues for virtual machines need service.

An application, e.g., a hypervisor or a hypervisor helper, executing on a device may create a large number, e.g., 1024 or more, of doorbell pages. The doorbell pages may be in a peripheral component interconnect express (PCIe) base address register (BAR) space, either input/output (IO) or memory-mapped IO (MMIO). The application uses the doorbell pages to determine when one or more queues of virtual machines executing on the device need service. The application may configure the assigned doorbell pages to notify the hypervisor with the list of pending doorbell pages, e.g., and the values written to the doorbell pages, when any doorbell page is written to by a virtual machine. Upon receipt of a notification, the hypervisor may provide the list of pending doorbells, or the corresponding queues, to a processor to cause the processor to service data requests stored in the queues. In some examples, the application may execute on a component included in the device and may include the memory used for the doorbell pages.

Each of the doorbell pages may have configurable semantics. For example, a NIC-100 style doorbell page may contain a 32-bit ring buffer index, e.g., may contain a queue, stored in memory and that is provided to the hypervisor. In some examples, an NVMe queue may contain an indication that a corresponding queue must be serviced and the corresponding queue, e.g., a ring buffer index, resides in a separate memory. In some examples, a virtio-net queue may contain an IO-space register that is written with the queue number of interest when a doorbell page is rung. The application, e.g., the hypervisor helper, may be programmed to provide each semantic of a doorbell page to a hypervisor.

In some examples, the application may generate a bit vector aggregate using the doorbell pages that have been rung to indicate all of the queues that require service. The application may provide the bit vector to a hypervisor to allow the hypervisor or a processor to quickly identify all queues that require service without needing to scan all queue doorbell values.

In some implementations, some of the doorbell pages may include settings that allow the application, e.g., or the hypervisor, to apply notification delaying, e.g., in the same fashion as interrupt controllers. For instance, after the hypervisor receives a notification that a particular doorbell page has been rung, the particular doorbell page may not alert the application of additional requests in a corresponding queue, e.g., the particular doorbell page may self-mask, until the application or the hypervisor re-enables the particular doorbell, e.g., after the corresponding queue has been serviced. In some examples, a particular doorbell page may include rate-limiting settings, e.g., that specify a frequency at which the hypervisor should be notified that the corresponding queue needs service.

In some implementations, each of the doorbell pages may occupy a separate 4 KB page, and optionally resides at a nonzero offset within that page, e.g., when a particular queue structure does not support a zero-offset. The application may map virtual machine memory accesses, e.g., identified in the queues, to individual doorbell pages, e.g., using standard x86 MMU and EPT paging, at a 4 KB page granularity, to restrict each virtual machine to only access its own assigned doorbell pages.

In some implementations, a helper application may redirect traffic during a live migration of another application. For instance, the helper application may perform page mirroring to allow a more granular migration of the other application, e.g., on a byte or multi-byte level, from a first device to a second device. For instance, after transfer of a page to the second device when a particular byte in the page is updated, the helper application may allow the transfer of a two byte data blocks, that includes the particular byte, to the second device so that the entire page does not have to be transferred to the second device.

In some implementations, the hypervisor helper or the helper application are applications executing on a device. In some implementations, the hypervisor helper or the helper application are hardware components included in a device, e.g., integrated with or connected to a device.

Queue Servicing

FIG. 1 is a block diagram of an example environment 100 in which a device 102 uses doorbell pages to determine when queues for virtual machines need service. The device 102 includes one or more processors A-B 104a-b. One of the processors A 104a executes a hypervisor 106 and one or both of the processors A-B 104a-b execute one or more virtual machines 108a-c.

When the virtual machines 108a-c have a request for data, either a read or a write request, the virtual machines 108a-c place an entry in a corresponding queue 110. For instance, the virtual machine A 108a may place read requests in a first queue A1 and may place write requests in a second queue A2. In some examples, a virtual machine may place all requests in a single queue, such as the queue B1 for the virtual machine B 108b. Each of the queues 110 may be a ring buffer or any other appropriate type of queue.

After placing a data request in a queue 110, the virtual machines 108a-c write a notification value to a corresponding doorbell page 112, e.g., ring the corresponding doorbell page 112. For example, when the virtual machine A 108a places a read request in the queue A1, the virtual machine A 108a may write the notification value to a doorbell page A1 specific to the queue A1. In some examples, one or more of the virtual machines 108a-c may write the notification value to the corresponding doorbell page 112 before placing a data request in a queue 110.

The device 102 responds to the writing of the notification value to the doorbell page 112 by notifying a processor A-D 104a-d that the corresponding queue needs service. For instance, the device 102 may update a corresponding bit vector A-D 114a-b and provide the updated bit vector to one of the processors 104a-d. Bit vector A 114a may include notification bit values for the queues A1, B1, and C1. When the device 102 receives a notification for any of the doorbell pages A1, B1, or C1, the device 102 updates the bit vector A 114a to indicate that the corresponding queue needs service. For example, a value of a first location of the bit vector A 114a indicates whether the queue A1 needs service, a value of a second location of the bit vector A 114a indicates whether the queue B1 needs service, and a value of a third location of the bit vector A 114a indicates whether the queue C1 needs service. Similarly values of locations in the bit vector B 114b correspond to the queues A2 and C2.

In some implementations, a value of "one" in the bit vector A 114a indicates that the corresponding queue needs service and a value of "zero" indicates that the corresponding queue does not need service. In other implementations, a value of "zero" indicates that the corresponding queue needs service and a value of "one" indicates that the corresponding queue does not need service.

In some implementations, the device 102 sends an interrupt to a hypervisor executing on a different processor core than the processor core executing the virtual machine with a queue that needs service. For instance, when the processor A 104a executes the virtual machine B 108b and the queue B1 needs service, the device 102 may notify the processor B 104b or the processor D 104d that the queue B1 needs service. The device 102 may send an interrupt to a hypervisor, or another application, executing on the different processor core to notify the hypervisor of the queue B1 that needs service.

In some implementations, the device 102 may buffer the notification value from the doorbell page for which the device 102 was notified. For instance, the device 102 may store the bit vector in memory and provide values from the bit vector, e.g., a copy of the bit vector, to a processor servicing the queues identified by the bit vector, or an application that is using the bit vector, on demand or lazily. In some examples, when a hypervisor helper manages the bit vector and the hypervisor 106 wants to clear one or more bits in the bit vector for queues that have been serviced and no longer need service, the hypervisor 106 may send a message to the hypervisor helper that identifies the bits to clear. The hypervisor helper may then clear the identified bits, keeping the bit vector up to date, e.g., a master copy of the bit vector up to date.

The device 102 may provide the bit vector 114a-b for the doorbell page 112 for which the device was notified to the processor 104a-d that will service the corresponding queues. For instance, when the device 102 updates the bit vector A 114a in response to a request for service for the queue B1, the device 102 provides the bit vector A 114a to the processor B 104b. The processor B 104b uses the bit vector A 114a to determine that the queue B1 needs service and, potentially, that the queue A1, the queue C1, or both, also need service, e.g., using the values of the corresponding locations of the bit vector 114a. The processor B 104b may then service the queues identified in the bit vector A 114a as needing service. For instance, the processor B 104b will access a first entry in the queue A1, determine the data requested by the first entry, and retrieve the requested data for use by the virtual machine A 108a.

Each of the doorbell pages 112 may include one or more settings. For instance, the doorbell pages 112 may indicate a desired bit position within a corresponding bit vector that should be updated when the respective doorbell page is rung.

In some examples, the doorbell pages 112 may include a notification coalescing setting that indicates whether notification coalescing should be performed. For example, the notification coalescing setting may be a Boolean value that denotes that an event has occurred and that the device 102 should suppress posting of further notifications for the respective doorbell page until the Boolean value is cleared. For instance, the device 102 may suppress posting further notifications, e.g., by setting the Boolean value to "true," until all entries in the corresponding queue have been serviced, e.g., then set the Boolean value to "false" so that the device 102 is notified of further entries added to the corresponding queue.

In implementations when the device 102 includes multiple bit vectors, each of the doorbell pages 112 may indicate a particular bit vector for the doorbell page. For instance, the device 102 may include one bit vector for each processor or processor core that will service requests from the virtual machines 108a-c and each of the doorbell pages may indicate which of the bit vectors should be updated when the doorbell page is rung so that the correct processor or processor core is notified about the corresponding queue that needs service. Some of the processors and processor cores may be included on the device 102, e.g., the processors A-B 104a-b. Some of the processors and processor cores may be included on one or more other devices, e.g., the processor C-D 104c-d. The processor or processor core that services a request may be included on a particular device with a memory that includes data for the request.

In some examples, the device 102 may receive a notification via a first doorbell page A1 that a first queue A1 for the virtual machine A 108a needs service and provide the bit vector A 114a, e.g., a copy of the bit vector, to the processor B 104b. When the device receives a notification via a second doorbell page A2 that a second queue A2 for the virtual machine A 108a needs service, the device 102 may provide a copy of the bit vector B 114b, after updating the bit vector in response to the notification, to the processor C 104c, e.g., included in another device.

In some implementations, each of the doorbell pages 112 may include a behavior on write setting that indicates an action the device 102 will perform when a corresponding queue 110 needs service and the corresponding doorbell page is rung. For instance, the device 102 may use the settings for a doorbell page to determine that the device 102 should update a value that indicates the number of new entries in the corresponding queue, the total number of entries in the corresponding queue, the number of non-new entries in the corresponding queue (that were in the queue prior to the most recent update to the queue), or a combination of two or more of these. In some examples, a doorbell page may include an index of a last entry in the corresponding queue. A doorbell page may include a value that indicates that a corresponding queue has an entry, e.g., and the device 102 monitors the value to determine when the value changes and does not care what the particular value is to determine that the doorbell page has been rung and the corresponding queue needs service.

In some implementations, the hypervisor 106, a hypervisor helper 118 application or device, or another application or device may respond to the writing of the notification value to the doorbell pages 112 or perform some of the other steps described above. For instance, the hypervisor helper 118 may send the interrupt to the hypervisor executing on a different processor core than the processor core executing the virtual machine with the queue that needs service. The hypervisor 106, the hypervisor helper 118, or the other application or device may own the memory that includes the doorbell pages 112.

The device 102 may include a personal computer, a mobile communication device, a server, and other devices that can send and receive data over a network 116. The network 116, such as a local area network (LAN), wide area network (WAN), the Internet, or a combination thereof, connects the device 102 and one or more other devices that include the processors C-D 104c-d.

Example Queue Servicing Process Flow

Figure 2:
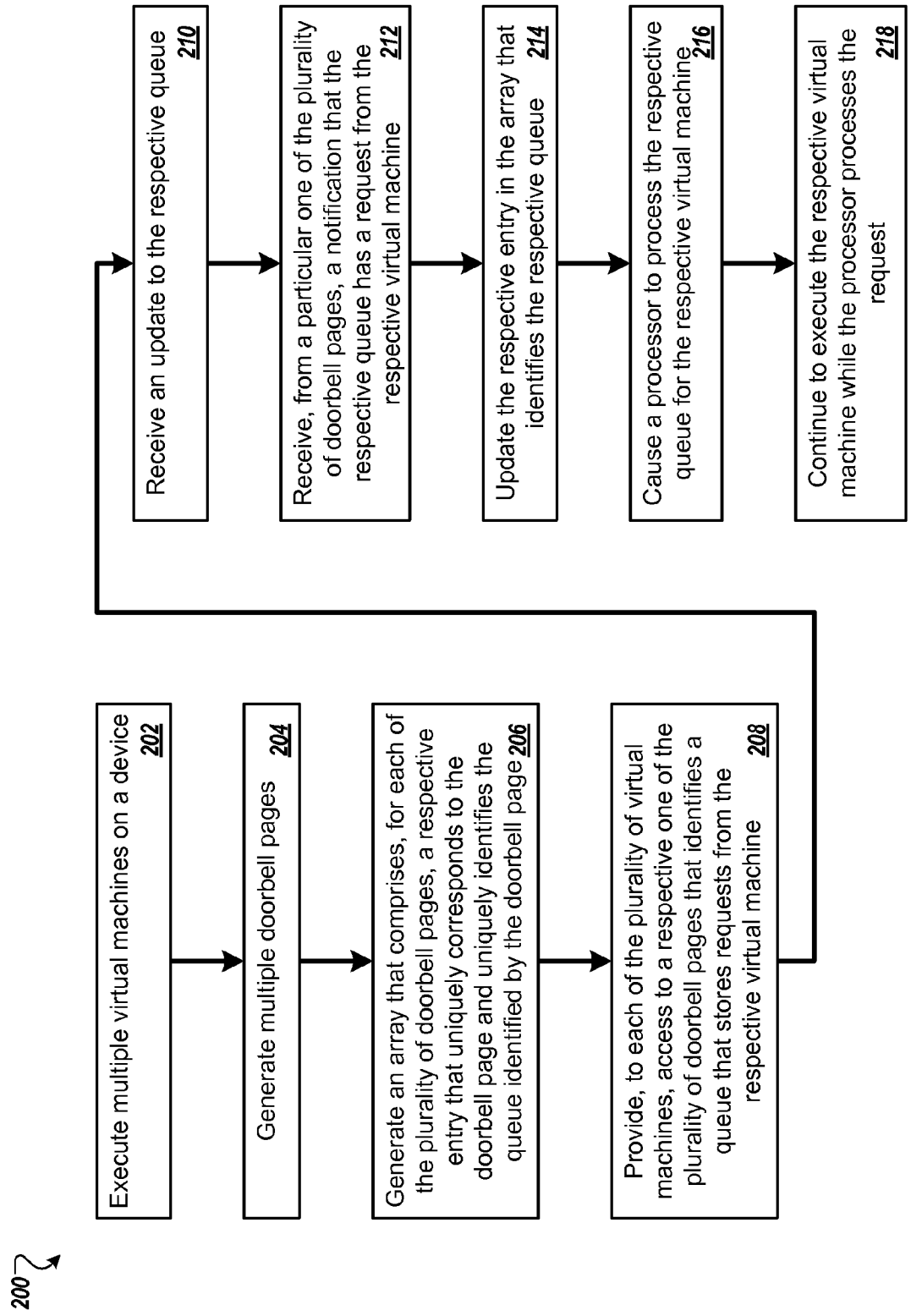
FIG. 2 is a flow diagram of a process for causing a processor to process a queue for a virtual machine.

FIG. 2 is a flow diagram of a process 200 for causing a processor to process a queue for a virtual machine. For example, the process 200 can be used by the device 102 from the environment 100, e.g., executing a hypervisor, a hypervisor helper, another application, another device, or a combination of two or more of these. In some examples, one of the applications may perform particular steps of the process 200 and a device or another application may perform other particular steps of the process 200.

A first device executes multiple virtual machines (202). For instance, the first device may be a server or another device executing multiple virtual machines. The first device may use a hypervisor application to execute one or more of the multiple virtual machines.

The first device generates multiple doorbell pages (204). The first device may generate a doorbell page for each of the virtual machines or for each queue of the virtual machines. In some examples, the first device generates more doorbell pages than the number of queues used by the virtual machines and dynamically associates doorbell pages to virtual machine queues upon the execution of a new virtual machine or a request for a new queue. For instance, a hypervisor helper may create the multiple doorbell pages or request the creation of the multiple doorbell pages from the hypervisor.

The first device may assign an address to each of the doorbell pages when generating the doorbell pages, e.g., an address of the doorbell page. In some implementations, the first device may generate a tracking structure for all of the doorbell pages and assign a respective index from the tracking structure to each of the doorbell pages. In some examples, a hypervisor may assign the addresses to each of the doorbell pages and provide the addresses to a hypervisor helper. The hypervisor helper may use a tracking structure, e.g., in the hypervisor helper, to monitor the doorbell pages.

The first device optionally generates an array that comprises, for each of the plurality of doorbell pages, a respective entry that uniquely corresponds to the doorbell page and uniquely identifies the queue identified by the doorbell page (206). For instance, the first device, e.g., a hypervisor helper, generates multiple bit vectors, one for each processor that will service the queues. Each of the doorbell pages corresponds with only one entry in a particular bit vector and does not correspond with an entry in any of the other bit vectors. The processor that uses the bit vector is able to use that one entry to determine the corresponding queue and service that corresponding queue.

The first device provides, to each of the plurality of virtual machines, access to a respective one of the plurality of doorbell pages that identifies a queue that stores requests from the respective virtual machine (208). For example, the first device provides the respective virtual machine with an address for the respective doorbell page, e.g., an address of a respective index for the respective doorbell page. In some examples, the doorbell page may be a head node of the corresponding queue and the first device may provide the address of the head node to the respective virtual machine. In some examples, a doorbell page may identify a ring buffer for the respective virtual machine to place requests for service, e.g., when the queue is the ring buffer. A hypervisor application may receive the address for the respective doorbell page from a hypervisor helper and provide the address to the respective virtual machine.

The first device receives an update to the respective queue (210). For instance, the respective virtual machine places a request for service, e.g., data, in the respective queue.

The first device receives, from a particular one of the plurality of doorbell pages, a notification that the respective queue has a request from the respective virtual machine (212). For example, the respective virtual machine updates a value of the doorbell page, e.g., using a behavior on write setting for the doorbell page. In response, the doorbell page notifies the first device, e.g., a hypervisor helper, that the value has changed.

The first device optionally updates the respective entry in the array that identifies the respective queue (214). For instance, a hypervisor helper updates the respective entry, e.g., in the bit vector, to a particular value that indicates that the respective queue needs service. The particular value may be "one" when "zero" indicates that the respective queue does not need service and "one" indicates that the respective value needs service. In some examples, the particular value may be "zero" or any other appropriate value. In some implementations, a hypervisor application updates the respective entry.

The first device causes a processor to process the respective queue for the respective virtual machine (216). In some examples, the first device, e.g., a hypervisor helper, provides the processor with an identifier for the respective queue. For example, the first device, e.g., the hypervisor or the hypervisor helper, provides the bit vector to the processor. In response to receiving the bit vector, the processor uses the bit vector to determine which queues need service, e.g., of the queues associated with the bit vector, and services those queues. In some examples, the first device provides the processor with an interrupt, e.g., to cause the processor to stop performing other work such as when the processor is not servicing a queue. In some implementations, a second device may include the processor.

The first device continues to execute the respective virtual machine while the processor processes the request (218). For instance, the first device may include a single processor that executes the respective virtual machine and services the request in parallel. In some examples, a first processor executes the respective virtual machine while a second device or a second processor concurrently services the request.

The order of steps in the process 200 described above is illustrative only, and causing the processor to process the queue for the virtual machine can be performed in different orders. For example, the first device may generate the doorbell pages and then execute the virtual machines.

In some implementations, the process 200 can include additional steps, fewer steps, or some of the steps can be divided into multiple steps. For example, the first device might not generate the array. In some examples, the first device may perform steps 208 through 218 and not steps 202 through 206.

Figure 3:
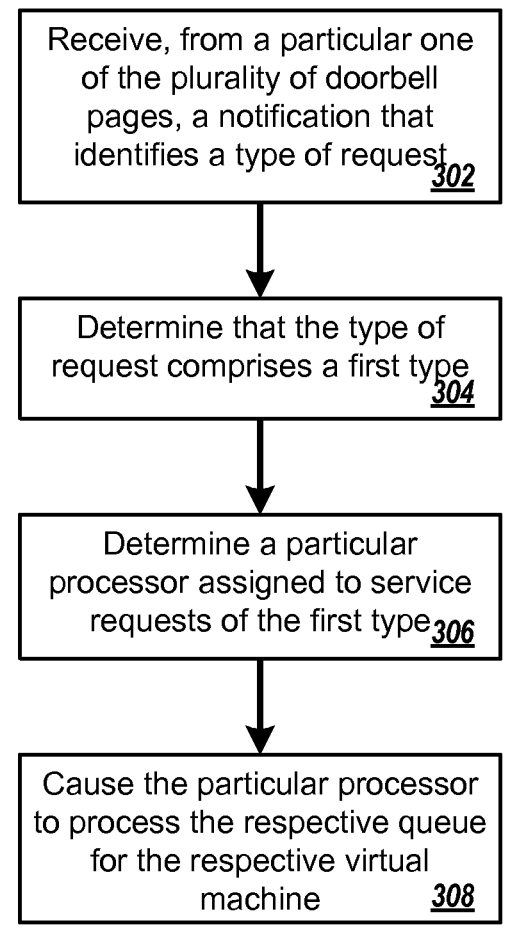
FIG. 3 is a flow diagram of a process for causing a particular processor to process a queue.

FIG. 3 is a flow diagram of a process 300 for causing a particular processor to process a queue. For example, the process 300 can be used by the device 102 from the environment 100. The device 102 may execute a hypervisor or a hypervisor helper application for one or more of the steps of the process 300, may include a hypervisor helper device that performs one or more of the steps of the process 300, or a combination of two or more of these.

A hypervisor receives, from a particular one of the plurality of doorbell pages, a notification that identifies a type of request (302). For instance, each of the doorbell pages may include a configuration setting that identifies the type of request. The type may be a read request, a write request, a read request from a particular memory, a write request to a particular memory, or another type of request. In some implementations, the hypervisor may use a behavior on write setting to determine the type of request.

The hypervisor determines that the type of request comprises a first type (304). For example, the hypervisor, or another application executing on a device, determines the particular type of the request, e.g., the first type, from multiple different types of requests.

The hypervisor determines a particular processor assigned to service requests of the first type (306). For instance, the hypervisor may execute on a first processor and determine that a second processor, on the same device or another device, should service the first type of requests.

The hypervisor causes the particular processor to process the respective queue for the respective virtual machine (308). For example, the hypervisor provides the particular processor with a message that indicates that the respective queue needs service. In some examples, the hypervisor may provide a bit vector to the particular processor that indicates that the respective queue needs service.

Application Migration

In some implementations, an application, e.g., a hypervisor or a helper application or device, may facilitate the transfer of execution of a virtual machine from one device to another. For instance, the application may notify a processor of which queues of the virtual machine need service during execution of the virtual machine on a first device and monitor byte dirtiness during migration of the virtual machine from the first device to a second device. In some examples, during a transfer of execution of a virtual machine from a first device to a second device, the application may notify a processor of bytes to be written to a memory, e.g., based on an entry in a queue for the virtual machine, and store data indicating the written bytes so that those bytes, and not a page that contains those bytes, will be transferred to the second device, e.g., when the page that contains those bytes was previously transferred to the second device but without the updates to the bytes. In some implementations, different applications facilitate transfer of execution of the virtual machine from one device to another and notify a processor of the queues of the virtual machine that need service.

Figure 4:
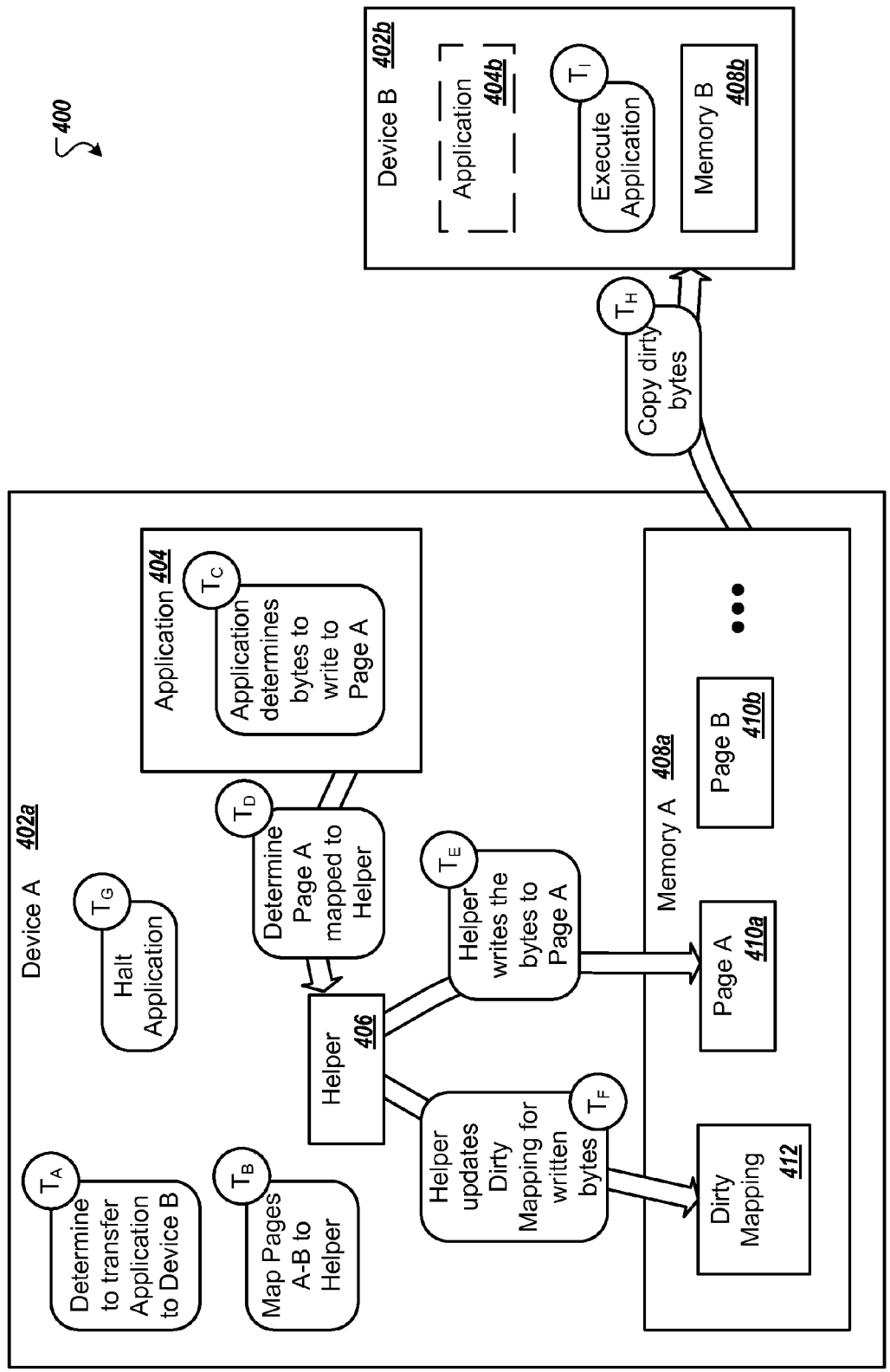
FIG. 4 is a block diagram of an example environment in which a device A 402a migrates an application to another device B.

FIG. 4 is a block diagram of an example environment 400 in which a device A 402a migrates an application 404 to another device B 402b. For instance, the device A 402a may execute the application 404, such as a virtual machine. At time TA, the device A 402a may determine to transfer the application 404 to the device B 402b. The device A 402a may make the determination in response to receipt of a message from another device indicating that the application 404 should be transferred. The device A 402a may make the determination in response to the performance of the application 404, or another application, executing on the device A 402a. For example, when the application 404 or the other application is performing below minimum performance requirements, the device A 402a may determine to transfer the application 404 to the device B 402b.

The device A 402a copies data for the execution of the application 404 to the device B 402b. For instance, the device A 402a may access a memory A 408a and provide copies of one or more pages A-B 410a-b of data for the application 404 from the memory A 408a to the device B 402b. The device B 402b may store the pages A-B 410a-b of data in a memory B 408b included in the device B 402b.

The device A 402a maps, at time TB, the pages in the memory A 408a to a helper 406, e.g., in a page mapping. The helper 406 may be an application or a device, e.g., a component included in the device A 402a. For instance, initially during the execution of the application 404, the device A 402a maps the pages A-B 410a-b to the application 404. When copying the pages A-B 410a-b to the device B 402b, or immediately prior to copying the pages A-B 410a-b to the device B 402b, the device 402a changes the page mapping so that the pages A-B 410a-b map to the helper 406 to allow the helper 406 to monitor granular dirtiness in the pages A-B 410a-b during the migration process. In some examples, the helper 406 notifies a hypervisor to update the page mapping. In some implementations, the helper 406 is a hypervisor helper or a hypervisor.

While the device A 402a copies data for the execution of the application 404 to the device B 402b, the device A 402a continues to execute the application 404. During the execution of the application 404, at time $T_C$, the application 404 determines bytes to write to the page A 410a.

At time $T_D$, the device 402a determines, using a memory mapping that indicates which pages are assigned to which applications, that the page A 410a is mapped to the helper 406, e.g., the helper 406 can edit the page A 410a and the application 404 cannot edit the page A 410a. The device 402a receives the bytes from the application 404 and provides the bytes for the write to the page A 410a to the helper 406.

The helper 406, at time $T_E$, writes the bytes to the page A 410a in the memory A 408a and, at time $T_F$, updates a dirty mapping 412, e.g., metadata for the pages, that indicates the bytes written to the page A 410a. The timing of $T_E$ and $T_F$ may be in any order. For instance, the helper 406 may update the dirty mapping 412 and then write the bytes to the page A 410a, perform both actions concurrently, or write the bytes and then update the dirty mapping 412.

In some implementations, the helper 406 allocates a new page for the bytes to be written, e.g., a new page in the memory A 408a. For instance, the helper 406 may allocate a new page from a buffer pool and store the writes for the bytes in the new page. The helper 406 then updates the mapping of the pages for read and write access requests for the page A 410a go to the newly allocated page instead of the page A 410a. In some examples, the helper 406 notifies a hypervisor to update the page mapping. The helper 406 may allocate the new page to allow the device A 402a to continue to copy the pages A-B 410a-b from the device A 402a to the device B 402b, e.g., without interruption because of the newly written bytes.

When the application 404 requests data for a read operation, the helper 406 receives a notification of the read request. The helper 406 uses the page mapping to determine the requested data and provides the requested data to the application 404. For instance, the helper 406 may return a known constant value, e.g., this page includes all zeros, values from a shared copy-on-write page, e.g., the device 402a may store only one copy of the page until the device 402a receives a write event at which time the device 402a makes a copy of the page and updates the copy with the new bytes, or decompress compressed data and provide the decompressed data to the application 404. During a read request, the helper 406 may access one of the pages A-B 410a-b when those pages do not have any updates, e.g., newly written bytes. During a read request, the helper 406 may access one or more newly allocated pages, e.g., when the corresponding pages have bytes that have been updated.

The device A 402a, at time TG, halts execution of the application 404. For instance, the device A 402a may complete copying the data for the execution of the application 404 to the device B 402b, with the exception of the dirty bytes, and then halt execution of the application 404. The device A 402a may halt the execution of the application 404 in response to determining that the device A 402a cannot continue to copy the data for the execution of the application 404 to the device B 402b without some of the data that still needs to be copied being written to, e.g., becoming dirty.

The device A 402a, or the helper 406, copies the dirty bytes for the application 404 to the device B 402b at time TH. For instance, the helper 406 uses the dirty mapping 412 to determine which bytes have been updated since copies of the corresponding pages were provided to the device B 402b and provides those bytes to the device B 402b.

The device B 402b uses the dirty bytes to update the copies of the pages in the memory B 408b. At time Ti, the device B 402b initiates execution of the application 404b.

After transferring the dirty bytes to the device B 402b, the device A 402a may remove all data for the application 404 from the memory A 408a. For instance, the device A 402a may determine which data for the application 404 is not used for the execution of another application and remove that data from the memory A 408a.

The devices 402a-b may include personal computers, mobile communication devices, servers, and other devices that can send and receive data over a network. The network, such as a local area network (LAN), wide area network (WAN), the Internet, or a combination thereof, connects the devices 402a-b, and potentially other devices (not shown).

In some implementations, the helper 406 includes a list of dirty multi-byte data blocks in the dirty mapping 412. For instance, the helper 406 may determine a granularity, e.g., two or four byte data blocks, of each write to one of the pages for the application 404 and update the dirty mapping 412 accordingly.

Example Application Migration Process Flow

Figure 5:
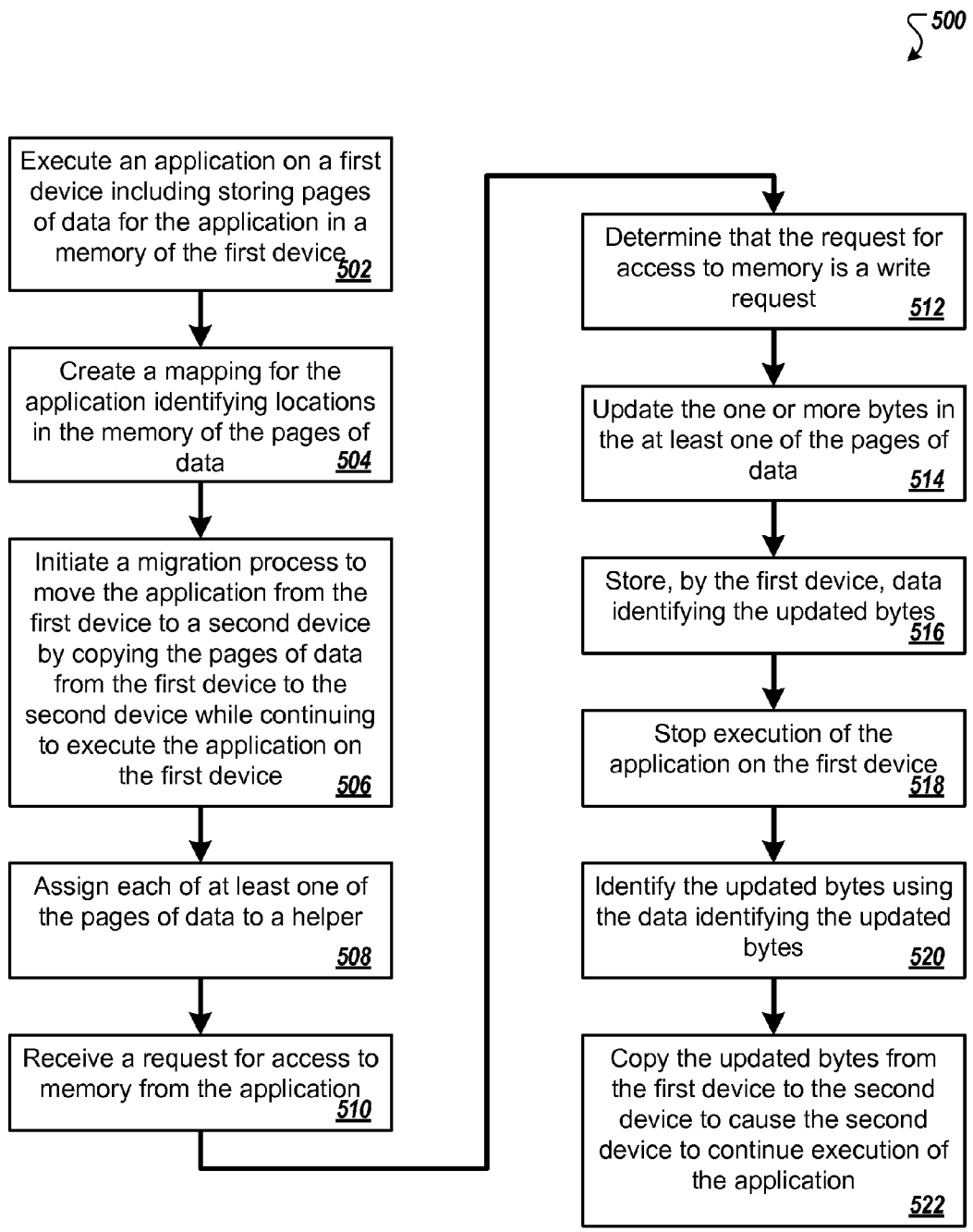
FIG. 5 is a flow diagram of a process for transferring an application from a first device to a second device.

FIG. 5 is a flow diagram of a process 500 for transferring an application from a first device to a second device. For example, the process 500 can be used by the device A 402a from the environment 400.

A first device executes an application including storing pages of data for the application in a memory of the first device (502). The pages of data may include instructions for the application, data operated on by the instructions for the application, or both. The application may be a virtual machine or another type of application that may be migrated from one device to another.

The first device creates a mapping for the application identifying locations in the memory of the pages of data (504). For instance, the first device creates a page mapping that indicates that the pages of data that are owned by the application.

The first device initiates a migration process to move the application from the first device to a second device by copying the pages of data from the first device to the second device while continuing to execute the application on the first device (506). For instance, the first device determines that the first device must be shut down or restarted and initiates the migration process.

The first device assigns each of at least one of the pages of data to a helper (508). For instance, the first device assigns all of the pages of data to the helper application or device. In some examples, the first device may assign some of the pages of data to the helper, e.g., the pages for data that may be operated on but not the pages that include only instructions. In some examples, the first device may dynamically assign the pages to the helper when the application attempts to write to the pages. The first device may assign the pages to the helper by updating the page mapping, e.g., to indicate that the helper owns the pages.

The first device receives a request for access to memory from the application (510). The request may be a read request or a write request. The first device may determine a type of the request, e.g., whether the request is a read request or a write request.

The first device determines that the request for access to memory is a write request (512). The first device updates the one or more bytes in the at least one of the pages of data (514). For instance, the helper receives the bytes from the application and updates the bytes in a memory. The helper may make a copy of a page to which the bytes should be written and update the bytes in the copy of the page, e.g., a newly allocated page, and uses the copy of the page for further read and write requests for that page.

The first device stores data identifying the updated bytes (516). For instance, the helper stores data indicating that the bytes were updated. The data may identify the particular page in which the bytes are stored and the specific locations within the page of the bytes. For example, the helper may update a dirty mapping to indicate that the bytes were overwritten. The dirty mapping may be for individual bytes or groups of bytes, e.g., a block of sixty-four bytes. Any appropriate granularity, smaller than a quantity of bytes included in a single page, may be used.

In some implementations, the data identifying the updated bytes may be a list of addresses for the bytes that are overwritten. For instance, the dirty mapping may be a log of the bytes that are overwritten. The list may include the addresses in the order of the time at which the bytes were written. In some examples, the list may be in numerical order of the addresses.

In some examples, the data identifying the updated bytes may be a bit vector with configurable granularity. For example, each bit in the bit vector may represent sixty-four bytes of memory and when one of the corresponding bytes is overwritten the entry in the bit vector is updated. The bit vector may include entries for all of the bytes in guest memory, e.g., for a particular application.

In some implementations, the first device may use a shadow structure that follows an extended page table (EPT) data layout. For instance, the first device may allocate 4 KB for an EPT leaf node and the next adjacent 4 KB in memory for a bit vector representing dirty bytes for the memory locations identified by the EPT leaf node, e.g., so that each bit in the bit vector represents sixty-four bytes of memory.

The first device stops execution of the application on the first device (518). For example, the first device stops execution of the application and forwards any requests for the application to the second device, e.g., so that the second device may provide the requests to the application when the application executes on the second device.

The first device identifies the updated bytes using the data identifying the updated bytes (520). The helper may use the dirty mapping to identify the updated bytes and, optionally, the pages which store the updated bytes.

The first device copies the updated bytes from the first device to the second device to cause the second device to continue execution of the application (522). The first device may send the copies of the updated bytes to the second device. The first device may send a message to the second device upon completion of the copying process that indicates that the second device should execute the application. In some implementations, the first device sends copies of only the updated bytes to the second device. In some examples, the first device sends a copy of a block of bytes to the second device, e.g., a sixty-four byte block, depending on the granularity of the data that identifies the updated bytes, e.g., the dirty mapping. For instance, when the dirty mapping indicates that one of the sixty-four bytes was overwritten in a particular block of sixty-four bytes, the first device sends a copy of the particular block of sixty-four bytes to the second device.

In some implementations, the process 500 can include additional steps, fewer steps, or some of the steps can be divided into multiple steps. For example, the first device may perform steps 506 through 522 without performing steps 502 and 504. In some examples, the first device or the helper may receive a read request from the application during the migration process and provide the application with the requested data.

Optional Implementation Details

In some implementations, the helper may be hardware implemented in a PCIe-attached application specific integrated circuit (ASIC) or field programmable gate array (FPGA). For instance, implementation of the helper in a PCIe-attached device may allow existing systems to use the helper without requiring changes to the physical hardware of the system.

In some implementations, the helper may be a system on a chip (SoC). For example, the helper may be a computer processor unit (CPU)-chip SoC function. The CPU-chip SoC function may be attached either via PCIe, coherent on-die fabric, or coherent off-chip fabric, e.g., an Intel® QuickPath Interconnect (QPI) or an ARM® Advanced eXtensible Interface (AXI) bus. In some implementations, the helper may be implemented in an off socket chip using QPI or an AXI bus.

When implemented in hardware, the helper may be able to write to memory, e.g., cache or CPU memory, and send interrupts. The helper may be able to respond to a large number of doorbell requests per second, e.g., five million doorbell requests per second.

ADDITIONAL IMPLEMENTATION DETAILS

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 6:
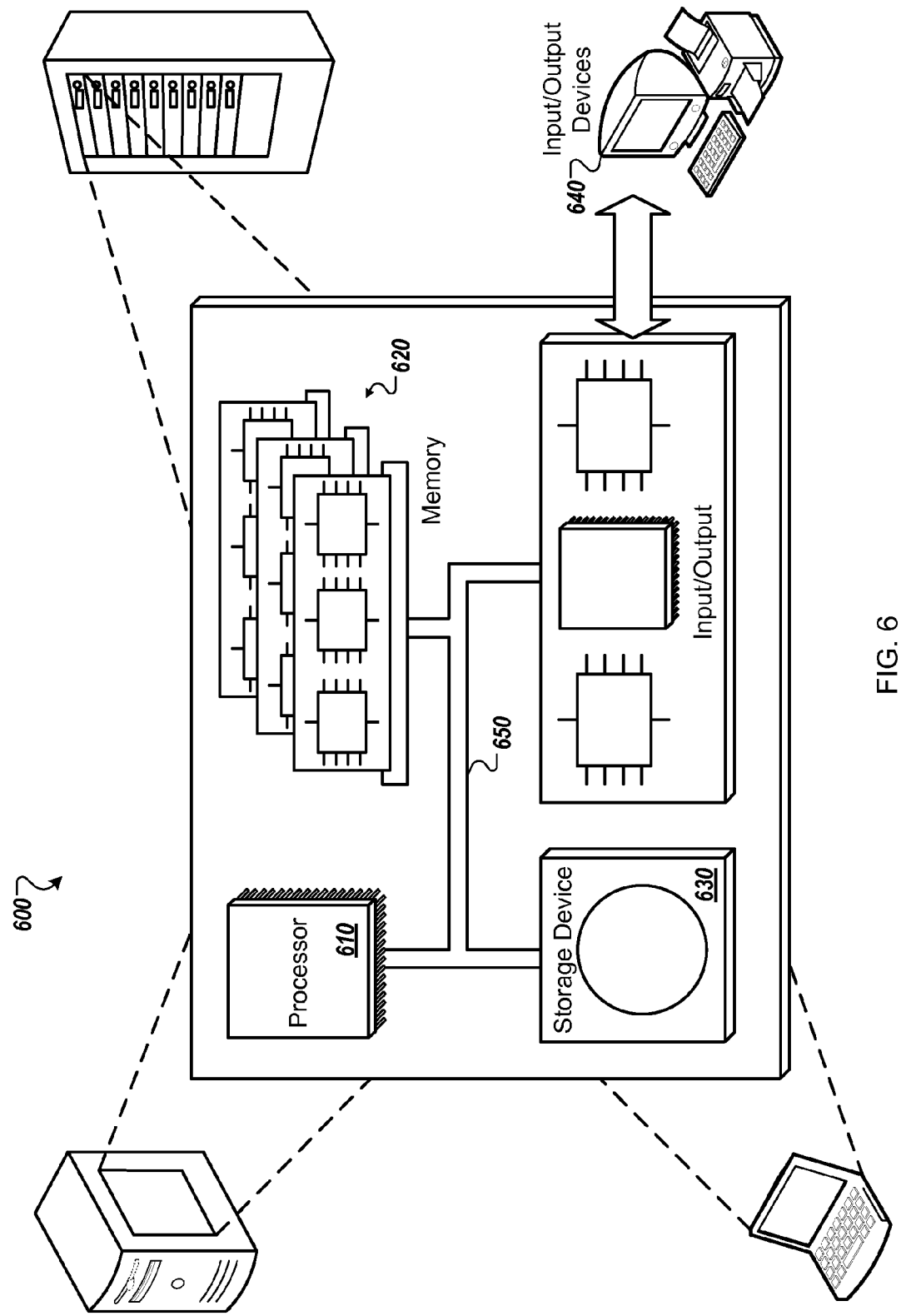
FIG. 6 is a block diagram of a computing system that can be used in connection with computer-implemented methods described in this document.

An example of one such type of computer is shown in FIG. 6, which shows a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   generating a plurality of doorbell pages for a plurality of virtual machines executing on a device by assigning a respective address to each of the plurality of doorbell pages;
   providing, to each of the plurality of virtual machines, access to a respective one of the plurality of doorbell pages that identifies a ring buffer that stores requests from the respective virtual machine by providing, to each of the plurality of virtual machines, the respective address to the respective virtual machine;
   receiving, from a particular one of the plurality of doorbell pages, a notification that the respective ring buffer has a request from the respective virtual machine; and
   in response to receiving the notification that the respective ring buffer has a request from the respective virtual machine, causing a processor to process the respective ring buffer for the respective virtual machine.

2. The method of claim 1, comprising:
   continuing to execute the respective virtual machine while the processor processes the request.

3. The method of claim 1, comprising:
   receiving an update to the respective ring buffer prior to receiving the notification that the respective ring buffer has a request from the respective virtual machine.

4. The method of claim 1, wherein causing a processor to process the respective ring buffer for the respective virtual machine comprises sending an interrupt to the processor.

5. The method of claim 1, wherein:
   generating the plurality of doorbell pages comprises generating a tracking structure and assigning a respective index from the tracking structure to each of the plurality of doorbell pages; and
   providing, to each of the plurality of virtual machines, access to the respective one of the plurality of doorbell pages that identifies the ring buffer that stores requests from the respective virtual machine comprises providing, to each of the plurality of virtual machines, an address for the respective index to the respective virtual machine.

6. The method of claim 1, wherein:
   generating the plurality of doorbell pages comprises:
      generating a page for each of the plurality of doorbell pages; and
      assigning, for each of the plurality of doorbell pages, a non-zero offset at which the respective one of the plurality of doorbell pages resides within the respective page; and
   providing, to each of the plurality of virtual machines, access to the respective one of the plurality of doorbell pages that identifies the ring buffer that stores requests from the respective virtual machine comprises providing, to each of the plurality of virtual machines, an address for the respective page and the non-zero offset to the respective virtual machine.

7. A computer-implemented method comprising:
   generating a plurality of doorbell pages for a plurality of virtual machines executing on a device;
   generating a bit vector that comprises, for each of the plurality of doorbell pages, a respective entry that uniquely corresponds to the doorbell page and uniquely identifies a queue that stores requests from the respective virtual machine and that is identified by the doorbell page;
   providing, to each of the plurality of virtual machines, access to a respective one of the plurality of doorbell pages that identifies the queue that stores requests from the respective virtual machine;
   receiving, from a particular one of the plurality of doorbell pages, a notification that the respective queue has a request from the respective virtual machine;
   in response to receiving the notification that the respective queue has a request from the respective virtual machine, updating the respective entry in the bit vector that identifies the respective queue; and
   in response to updating the respective entry in the bit vector that identifies the respective queue, causing a processor to process the respective queue for the respective virtual machine by providing the bit vector to the processor to cause the processor to process the respective queue for the respective virtual machine.

8. The method of claim 7, wherein providing the bit vector to the processor to cause the processor to process the respective queue for the respective virtual machine comprises providing the bit vector to the processor to cause the processor to process multiple queues for the plurality of virtual machines.

9. The method of claim 7, comprising:
   continuing to execute the respective virtual machine while the processor processes the request.

10. The method of claim 7, comprising:
    receiving an update to the respective queue prior to receiving the notification that the respective queue has a request from the respective virtual machine.

11. A computer-implemented method comprising:
    generating a first plurality of doorbell pages for a plurality of virtual machines executing on a device;
    providing, to each of the plurality of virtual machines, access to a respective one of the first plurality of doorbell pages that identifies a first queue that stores first requests from the respective virtual machine, each of the first requests having a first type;
    generating a second plurality of doorbell pages;
    providing, to each of at least some of the plurality of virtual machines, access to a respective one of the second plurality of doorbell pages that identifies a second queue that stores second requests from the respective virtual machine, the first type of the first requests being different than a second type of the second requests;
    receiving, from a particular one of the plurality of doorbell pages, a notification that the respective queue has a request from the respective virtual machine and that identifies a type of request; and
    in response to receiving the notification that the respective queue has a request from the respective virtual machine:
       determining that the type of request comprises the first type;
       determining a particular processor assigned to service requests of the first type; and
       causing the particular processor to process the respective queue for the respective virtual machine.

12. The method of claim 11, comprising:
    executing the plurality of virtual machines on a first processor of the device, wherein causing the particular processor to process the respective queue for the respective virtual machine comprises providing a message to a hypervisor executing on a second, different processor to cause the second, different processor to process the respective queue for the respective virtual machine.

13. The method of claim 12, wherein providing the message to the hypervisor executing on the second, different processor comprises providing the message to the hypervisor executing on the second, different processor on a second device different from the device.

14. A system comprising:
a memory;
a data processing apparatus; and
a non-transitory computer readable storage medium in data communication with the data processing apparatus and storing instructions executable by the data processing apparatus and upon such execution cause the data processing apparatus to perform operations comprising:
storing a plurality of doorbell pages in the memory for a plurality of virtual machines executing on the system by assigning a respective address to each of the plurality of doorbell pages;
providing, to each of the plurality of virtual machines, access to a respective one of the plurality of doorbell pages that identifies a ring buffer that stores requests from the respective virtual machine by providing, to each of the plurality of virtual machines, the respective address to the respective virtual machine;
receiving, from a particular one of the plurality of doorbell pages, a notification that the respective ring buffer has a request from the respective virtual machine; and
in response to receiving the notification that the respective ring buffer has a request from the respective virtual machine, causing a processor to process the respective ring buffer for the respective virtual machine.

15. The system of claim 14, wherein the data processing apparatus comprises the processor that processes the respective ring buffer for the respective virtual machine.

16. The system of claim 14, comprising:
the processor, different from the data processing apparatus, the operations comprising:
executing the plurality of virtual machines on the data processing apparatus, wherein causing the processor to process the respective ring buffer for the respective virtual machine comprises providing a message to a hypervisor executing on the processor to cause the processor to process the respective ring buffer for the respective virtual machine.

17. The system of claim 16, comprising:
a first device that includes the data processing apparatus; and
a second device that includes the processor, wherein providing the message to the hypervisor executing on the processor comprises providing the message to the hypervisor executing on the processor on the second device different from the first device.

18. The system of claim 14, wherein:
storing the plurality of doorbell pages in the memory comprises:
generating a page for each of the plurality of doorbell pages; and
assigning, for each of the plurality of doorbell pages, a non-zero offset at which the respective one of the plurality of doorbell pages resides within the respective page; and
providing, to each of the plurality of virtual machines, access to the respective one of the plurality of doorbell pages that identifies the ring buffer that stores requests from the respective virtual machine comprises providing, to each of the plurality of virtual machines, an address for the respective page and the non-zero offset to the respective virtual machine.

19. A non-transitory computer readable storage medium storing instructions executable by a data processing apparatus and upon such execution cause the data processing apparatus to perform operations comprising:
generating a plurality of doorbell pages for a plurality of virtual machines executing on a device by assigning a respective address to each of the plurality of doorbell pages;
providing, to each of the plurality of virtual machines, access to a respective one of the plurality of doorbell pages that identifies a ring buffer that stores requests from the respective virtual machine by providing, to each of the plurality of virtual machines, the respective address to the respective virtual machine;
receiving, from a particular one of the plurality of doorbell pages, a notification that the respective ring buffer has a request from the respective virtual machine; and
in response to receiving the notification that the respective ring buffer has a request from the respective virtual machine, causing a processor to process the respective ring buffer for the respective virtual machine.

* * * * *